US012725957B2

(12) United States Patent
Kurimoto

(10) Patent No.: US 12,725,957 B2
(45) Date of Patent: Sep. 1, 2026

(54) ELECTRICAL CONTACT UNIT AND ELECTRICAL CONTACT DEVICE

(71) Applicant: Globetech Inc., Tokyo (JP)

(72) Inventor: Keisuke Kurimoto, Tokyo (JP)

(73) Assignee: Globetech Inc., Tokyo (JP)

( * ) Notice: Subject to any disclaimer, the term of this patent is extended or adjusted under 35 U.S.C. 154(b) by 348 days.

(21) Appl. No.: 18/397,774

(22) Filed: Dec. 27, 2023

(65) Prior Publication Data

US 2024/0136749 A1 Apr. 25, 2024
US 2024/0235085 A9 Jul. 11, 2024

(51) Int. Cl.
*H01R 13/187* (2006.01)

(52) U.S. Cl.
CPC .................................. *H01R 13/187* (2013.01)

(58) Field of Classification Search
CPC .................................................... H01R 13/187
See application file for complete search history.

(56) References Cited

U.S. PATENT DOCUMENTS 11,088,478 B2 * 8/2021 Ho ..................... H01R 13/2435
2018/0205168 A1 * 7/2018 Ju ..................... H01R 13/2435
2018/0331474 A1 * 11/2018 Ju ..................... H01R 12/7082
2019/0173207 A1 * 6/2019 Ju ..................... H01R 12/714
2023/0018797 A1 * 1/2023 Jin ..................... H01R 13/516
2024/0136749 A1 * 4/2024 Kurimoto ............ H01R 13/187

FOREIGN PATENT DOCUMENTS

JP H526904 A 2/1993
JP H7282881 A 10/1995
WO WO-2008092284 A1 * 8/2008 ............... H01R 4/48

OTHER PUBLICATIONS

Office action issued Nov. 21, 2023 in related Application JP 2021-100246, with English machine translation, 5 pages.

* cited by examiner

*Primary Examiner* — Abdullah A Riyami
*Assistant Examiner* — Nader J Alhawamdeh
(74) *Attorney, Agent, or Firm* — Muncy, Geissler, Olds & Lowe, P.C.

(57) ABSTRACT

An electrical contact unit includes: a conductive part that is adapted to abut on a first member and a second member; and a support part that swingably supports the conductive part. The conductive part has: a first abutting part that abuts on the first member; a second abutting part that abuts on the second member; and a swinging fulcrum that is located between the first abutting part and the second abutting part. The support part supports at least the swinging fulcrum, and the conductive part rotates at the swinging fulcrum causing the first abutting part to be pressed against the first member when the second member is pressed against the second abutting part.

6 Claims, 9 Drawing Sheets

ELECTRICAL CONTACT UNIT AND ELECTRICAL CONTACT DEVICE

BACKGROUND OF THE INVENTION

1. Field of the Invention

This invention relates to technology for electrical contacts that electrically connect a first member and a second member.

2. Description of the Related Art

Patent literature 1 discloses a contact element having a thin support plate having spring elasticity and a plurality of web elements. The web elements are plate-shaped and are attached with their ends bent so as to sandwich the thin support plate, and are attached so as to be able to elastically contact a contact target.

[Patent Literature 1] WO 2008/092284

In the technology described in Patent Literature 1, since the web elements are configured to come into contact with the contact target and elastically deform in the direction perpendicular to the thin support plate, the elastic force may drop and contact may become unstable if the contact margin of the web elements is increased.

SUMMARY OF THE INVENTION

A purpose of the present invention is to provide technology for electrical contacts that makes it easy to increase the length of the protrusion of a conductive part from a first member.

One embodiment of the present invention relates to an electrical contact unit that is provided in a first member and that electrically connects the first member and a second member, including: a conductive part that is adapted to abut on the first member and the second member; and a support part that swingably supports the conductive part. The conductive part has: a first abutting part that abuts on the first member; a second abutting part that abuts on the second member; and a swinging fulcrum that is located between the first abutting part and the second abutting part. The support part supports at least the swinging fulcrum, and the conductive part rotates at the swinging fulcrum causing the first abutting part to be pressed against the first member when the second member is pressed against the second abutting part.

Another embodiment of the present invention relates to an electrical contact device that electrically connects a first member and a second member. The electrical contact device includes: the first member; a support part that is provided in the first member; and a conductive part that is swingably supported by the support part and is adapted to abut on the first member and the second member. The conductive part has: a first abutting part that abuts on the first member; a second abutting part that abuts on the second member; and a swinging fulcrum that is located between the first abutting part and the second abutting part. The support part supports at least the swinging fulcrum, and the conductive part rotates at the swinging fulcrum causing the first abutting part to be pressed against the first member when the second member is pressed against the second abutting part.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Figure 1:
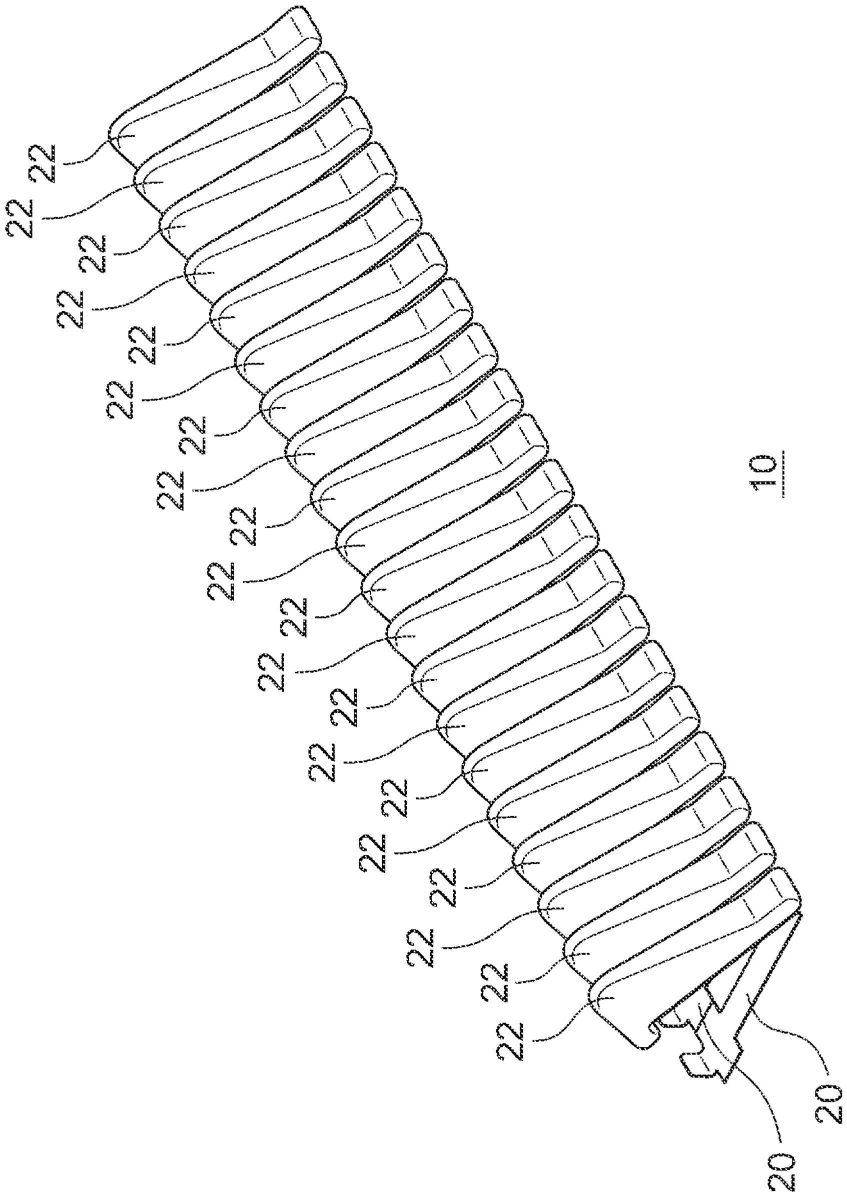
FIG. 1 is a perspective view of an electrical contact unit according to an exemplary embodiment.

FIG. 1 is a perspective view of an electrical contact unit 10 according to an exemplary embodiment. The electrical contact unit 10 is attached to an unshown first member and pressed against a flat portion of an unshown second member so as to electrically connect the first and second members.

The electrical contact unit 10 has support parts 20 and conductive parts 22 and is formed in a longitudinal shape. The conductive parts 22 abuts on the first member and the second member so as to enable energization. The conductive parts 22 are provided in parallel so as to be spaced apart in the longitudinal direction, and the electrical contact unit 10 realizes electrical connection at multiple points of contact. Although the support parts 20 are each provided for each conductive part 22, the support parts 20 lie in a row in the longitudinal direction.

Since the support parts 20 and the conductive parts 22 are formed using separate materials, the support parts 20 can be formed of a material with low conductivity, and it is possible to increase the corrosivity by plating, etc., or to use a material with excellent elasticity or high temperature resistance. Further, formation of the support parts 20 using a material whose conductivity is lower than that of the conductive parts 22 causes a conductive path at the time of energization to pass only through the conductive parts 22 and can prevent the conductive path from passing the support parts 20. Further, by reducing the percentage of the conductive parts 22 occupied in the electrical contact unit 10, costs can be reduced even if expensive materials such as silver plating are used.

Figure 2:
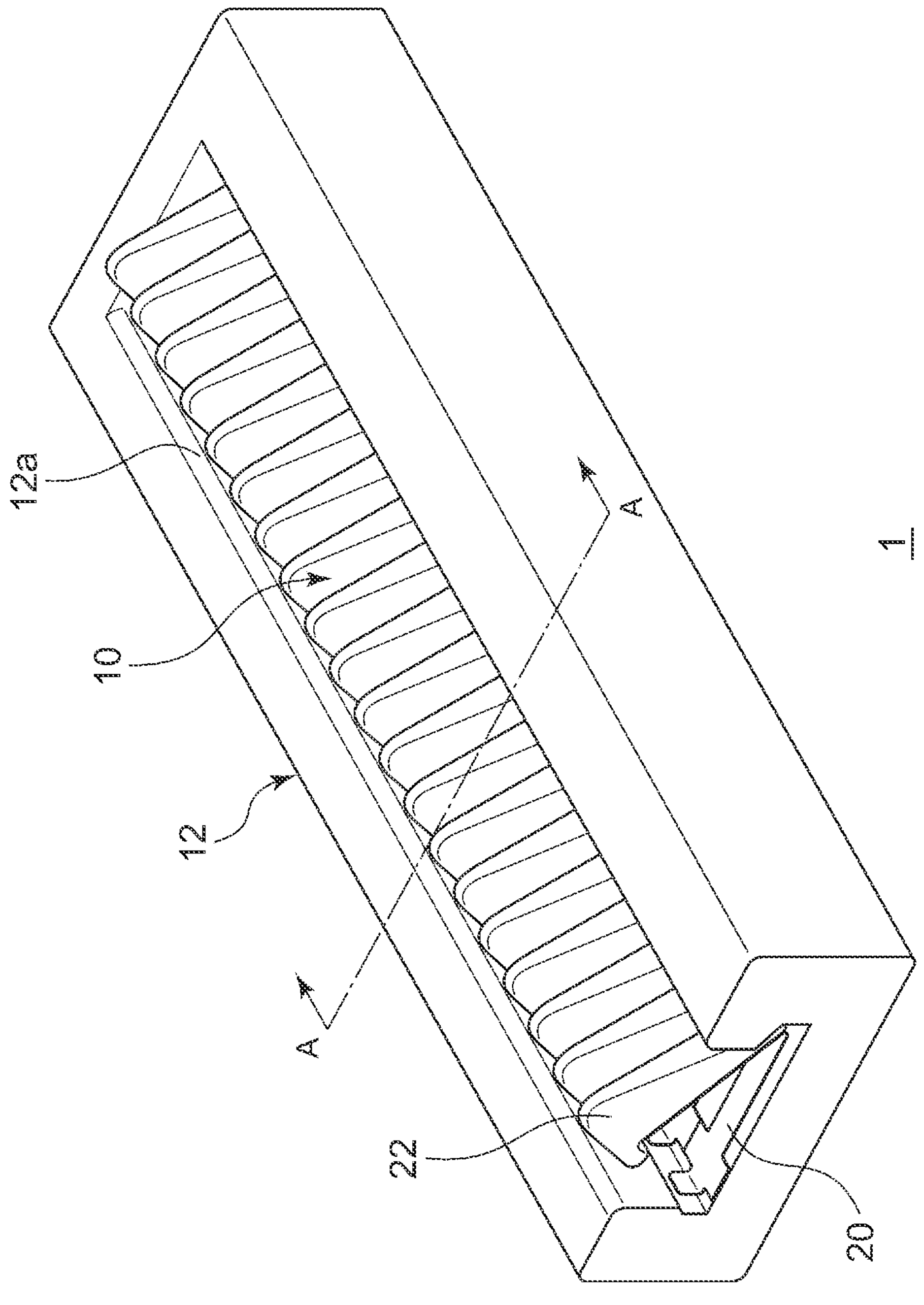
FIG. 2 is a perspective view of an electrical contact device attached to a first member.

FIG. 2 is a perspective view of an electrical contact device 1 attached to a first member 12. The electrical contact device 1 is provided with the electrical contact unit and the first member 12. The electrical contact unit 10 is mounted in a groove 12*a* formed in the first member 12, and a plurality of conductive parts 22 protrude above the first member 12.

Figure 3:
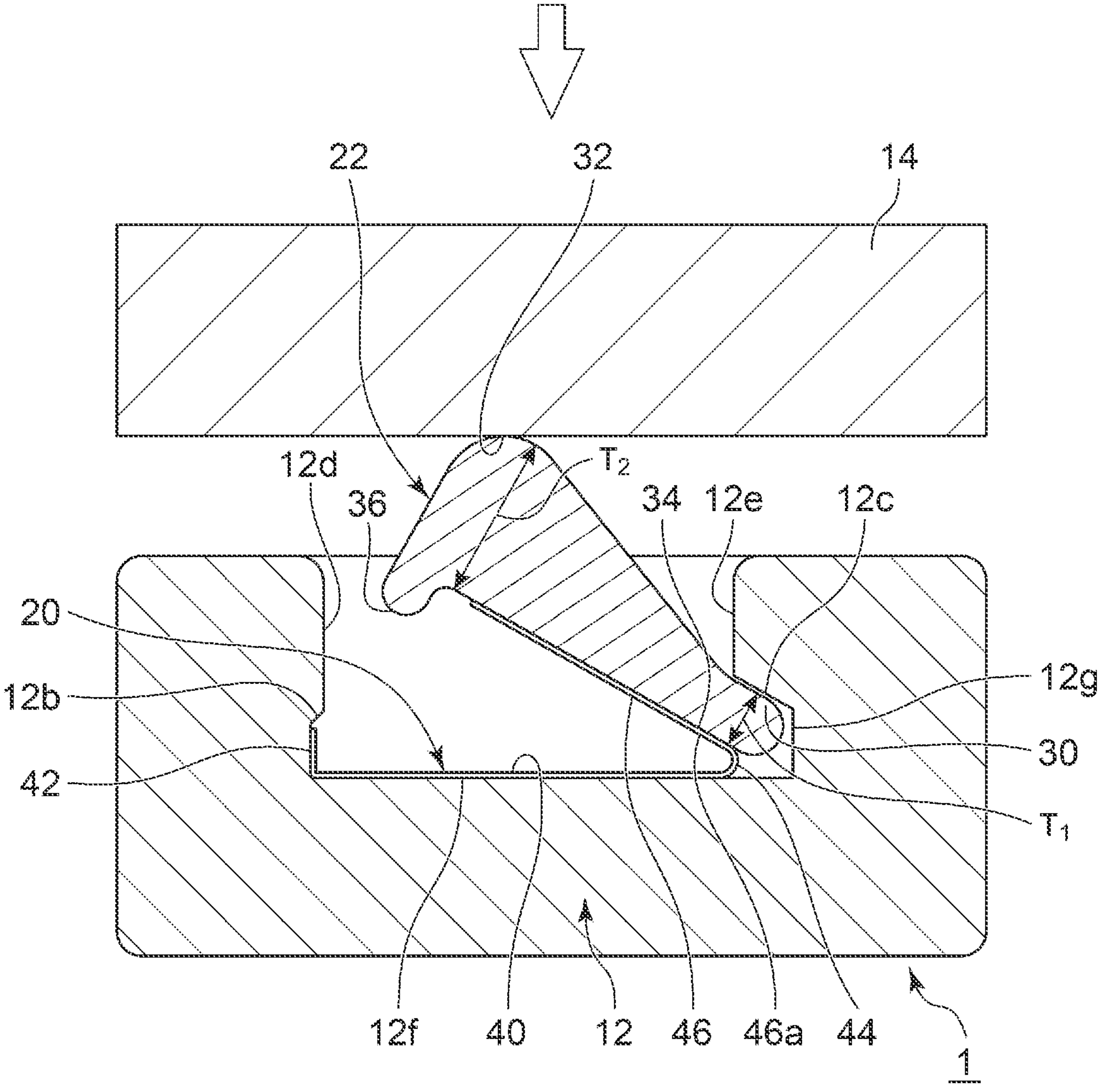
FIG. 3 is a cross-sectional view sectioned along line A-A of the electrical contact device shown in FIG. 2.

FIG. 3 is a cross-sectional view sectioned along line A-A of the electrical contact device 1 shown in FIG. 2. Further, FIG. 3 shows a second member 14 serving as the counterpart of the electrical connection. The second member 14 shown in FIG. 3 is in a state where the contact with the electrical contact unit 10 has just started, and the connection is completed when the second member 14 is pushed further toward the first member 12 and hits the first member 12. The cross-section shown in FIG. 3 is along a direction, the upward direction, in which a support part 20 biases a conductive part 22.

The first member 12 has a groove 12*a*, a ramp 12*b*, a restricting surface 12*c*, a first inner surface 12*d*, a second inner surface 12*e*, a bottom surface 12*f*, and a recess 12*g*. The groove 12*a* is defined by the opposing first and second inner surfaces 12*d* and 12*e* and the bottom surface 12*f*. The ramp 12*b* is formed on the first inner surface 12*d* and can catch the support part 20. The direction in which the first inner surface 12*d* and the second inner surface 12*e* face each other is referred to as a width direction, and the width direction is the left-right direction in FIG. 3.

The bottom surface 12*f* functions as a seating surface on which the support part 20 sits. The recess 12*g* is formed being recessed in the lower part of the second inner surface 12*e*. The recess 12*g* forms a space into which an end of the conductive part 22 enters. The restricting surface 12*c* is located on the upper surface of the recess 12*g* and faces the bottom surface 12*f*.

The restricting surface 12*c* abuts on the conductive part 22 and restricts the electrical contact unit 10 from being removed from the first member 12. The restricting surface 12*c* is inclined with respect to the bottom surface 12*f* to facilitate insertion of the conductive part 22 into the recess 12*g*. The conductive part 22 is fitted into the recess 12*g*. The ramp 12*b*, the restricting surface 12*c*, and the recess 12*g* are formed along the longitudinal direction of the groove 12*a* and over almost the entire area of the groove 12*a*.

The conductive part 22 has a first abutting part 30, a second abutting part 32, a swinging fulcrum 34, and a stopper 36. The conductive part 22 is not flexible like the support part 20 and is rigid. The first abutting part 30 is located at one end of the conductive part 22 and the second abutting part 32 is located at the other end of the conductive part 22. The first abutting part 30 abuts on the first member 12 and the second abutting part 32 abuts on the second member 14.

The first abutting part 30 enters the recess 12*g* and is arranged facing the restricting surface 12*c*. The restricting surface 12*c* is sloped along the surface of the first abutting part 30 in a normal state shown in FIG. 3, stabilizing the orientation of the conductive part 22 in a mounted state. The normal state is a state in which the first member 12 and the second member 14 are not energized and in which the second member 14 is not pressed against the conductive part 22. The first abutting part 30 is fitted into the recess 12*g* in the normal state and may abut on or be separated from the restricting surface 12*c*.

The second abutting part 32 sticks out from the groove 12*a* and protrudes above the first member 12. The stopper 36 is located at the other end of the conductive part 22 and protrudes downward. The stopper 36 abuts on the support part 20 on the bottom surface 12*f* side so as to prevent excessive displacement of the conductive part 22.

The swinging fulcrum 34 is located between the first abutting part 30 and the second abutting part 32 in the width direction. The swinging fulcrum 34 is supported by the support part 20 and serves as a rotational fulcrum for the conductive part 22 that is swinging. Further, the swinging fulcrum 34 is located closer to the second abutting part 32 than to the first abutting part 30 in the width direction.

The thickness T1 of the conductive part 22 at the first abutting part 30 is thinner than the thickness T2 of the conductive part 22 at the second abutting part 32. The conductive part 22 is formed to be thinner at the first abutting part 30 than that at the second abutting part 32. This makes it easier to insert the first abutting part 30 into the recess 12*g*. Also, by making the thickness T2 of the conductive part 22 at the second abutting part 32 thicker, the amount by which the second abutting part 32 protrudes from the first member 12 can be increased even if the inclination angle of the conductive part 22 is small, making dimensional errors of the first member 12 and the second member 14 more tolerable. Further, by increasing the amount by which the second abutting part 32 protrudes from the first member 12, the range in which the second member can come into contact with the electrical contact unit 10 can be increased.

The support part 20 has an engaging piece 40, a bending part 44, and a connecting part 46. The support part 20 is a plate-shaped spring member formed, for example, of a metallic material, which biases the conductive part 22 toward the second member 14. The support part 20 may be plated.

The engaging piece 40 extends along the bottom surface 12*f* and sits on the bottom surface 12*f*. The engaging piece 40 has an engaging claw 42 formed at an end of the engaging piece 40 on the first inner surface 12*d* side. The engaging claw 42 engages with the ramp 12*b* and restricts movement of the end of the engaging piece 40 of being removed from the groove 12*a*. The engaging piece 40 is connected in the longitudinal direction of the first member 12.

The bending part 44 is formed such that the bending part 44 is bent and curved being folded back from the engaging piece 40. The bending part 44 is located closer to the second abutting part 32 side than to the first abutting part 30 side, and the first abutting part 30 sticks out more toward the recess 12*g* side in the width direction compared to the bending part 44. The connecting part 46 extends from the bending part 44 so as to face the engaging piece 40 and connects to the conductive part 22. The connecting part 46 is in surface contact along the lower surface of the conductive part 22 and is adhered by welding or adhesion so as to connect to the conductive part 22.

The connecting part 46 is adhered to the lower surface of the conductive part 22 with a fixed width, and an adhered end 46*a* of the adhered part, which is located the closest to the bending part 44 side in the width direction, supports the swinging fulcrum 34 of the conductive part 22. Thereby, the conductive part 22 is swingably supported by the connecting part 46.

The electrical contact unit 10 is attached to the first member 12 through the engaging claw 42 of the engaging piece 40 getting caught by the ramp 12*b* and the first abutting part 30 of the conducting part 22 getting caught by the restricting surface 12*c*, causing both sides of the electrical contact unit 10 to get caught in the groove 12*a* of the first member 12.

Figure 4:
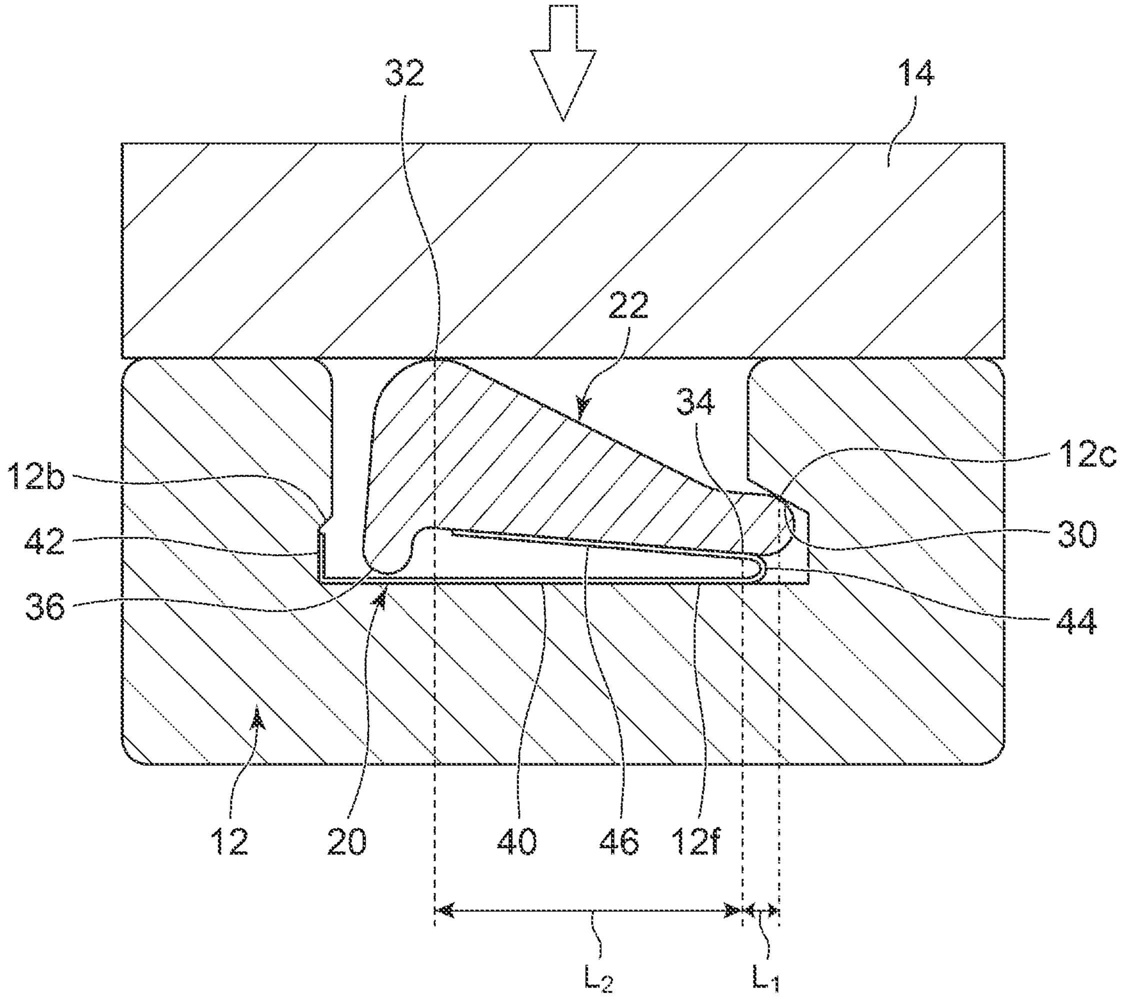
FIG. 4 is a cross-sectional view of an electrical contact device in a state where connection to a second member is completed.

FIG. 4 is a cross-sectional view of the electrical contact device 1 in a state where connection to the second member 14 is completed. The second member 14 abuts on the first member 12 and is pressed against the electrical contact unit 10.

The second abutting part 32 of the conductive part 22 is pushed by the second member 14 toward the bottom surface 12*f*, the conductive part 22 rotates at the swinging fulcrum 34, and the first abutting part 30 is pressed against the restricting surface 12*c*. Thereby, the first member 12 and the second member 14 are energized in a conductive path passing from the second abutting part 32 through the first abutting part 30. Since the swinging of the conductive part 22 does not interfere with adjacent conductive parts 22, a plurality of conductive parts 22 can be arranged at a narrow pitch. By making an electrical connection by the swinging of the conductive part 22, it is easy to set the conductive part 22 to protrude greatly from the groove 12*a*, and it is possible to set the pressing force applied by the second member 14 to be small.

In the width direction, the length L1 between the first abutting part 30 and the swinging fulcrum 34 is shorter than the length L2 between the second abutting part 32 and the swinging fulcrum 34 and is, for example, half the length L2 between the second abutting part 32 and the swinging fulcrum 34 or less. This increases the force with which the first abutting part 30 is pressed against the restricting surface 12*c* even if the pressing force of the second member 14 is small. Therefore, an oxide film formed on the restricting surface 12*c* over time can be scraped off, reducing the resistance caused by the oxide film and facilitating the flow of electric current.

The swinging of the conductive part 22 displaces the connecting part 46 such that the connecting part 46 approaches the bottom surface 12*f* along with the conductive part 22, causing the bending part 44 and its surroundings to flex. Thereby, the conductive part 22 is biased upward, the first abutting part 30 is pressed against the restricting surface 12*c*, and the second abutting part 32 is pressed against the second member 14 so as to stabilize the contact state.

Further, by lifting the first abutting part 30 toward the restricting surface 12*c*, the bending part 44 is lifted away from the bottom surface 12*f*. In other words, when the conductive part 22 is pressed against the second member 14 and swung, the bending part 44 is displaced toward the second member 14. This suppresses large deformation of the bending part 44 and makes it difficult for plastic deformation to occur, thereby improving durability.

Figure 5:
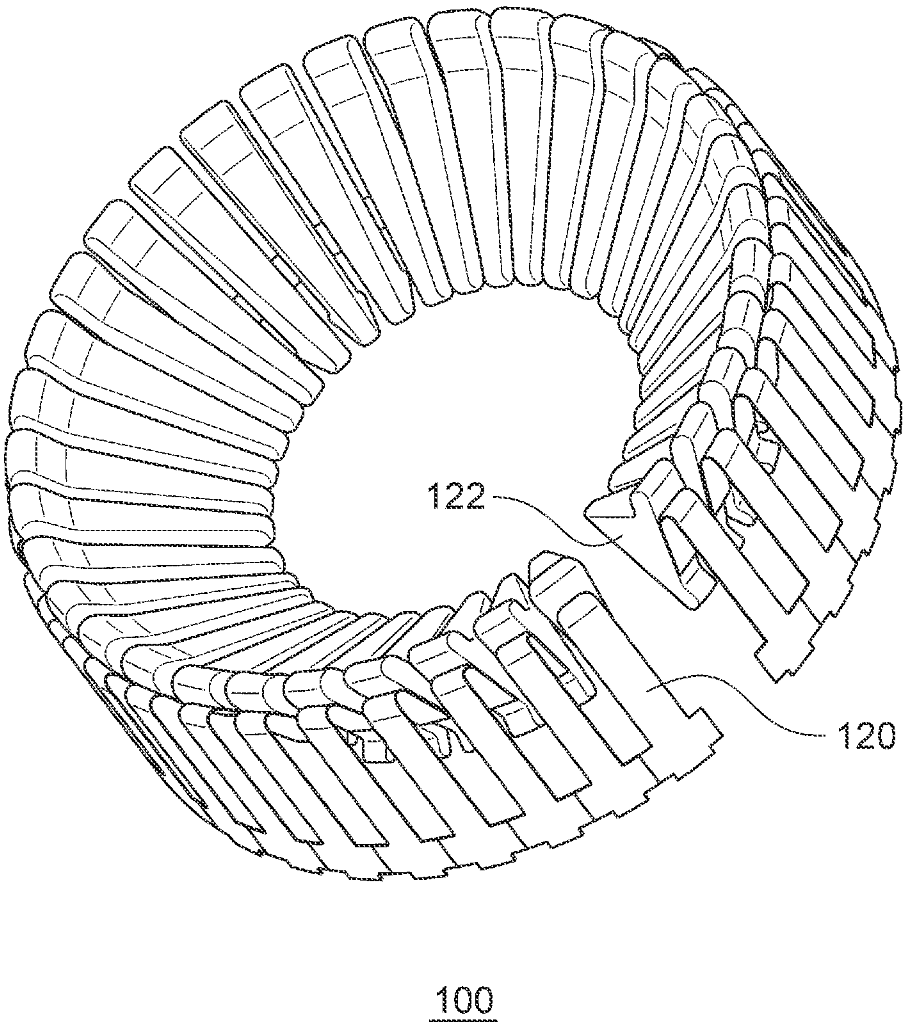
FIG. 5 is a perspective view of an electrical contact unit according to the first exemplary variation.

FIG. 5 is a perspective view of an electrical contact unit 100 according to the first exemplary variation. The electrical contact unit 100 according to the first exemplary variation differs from the electrical contact unit shown in FIG. 1 in that the electrical contact unit 100 is formed in an annular shape.

The electrical contact unit 100 has support parts 120 and conductive parts 122. The conductive parts 122 are located on the inner surface of the support parts 120 in the radial direction, and a plurality of conductive parts 122 are provided spaced apart in the circumferential direction.

Figure 6:
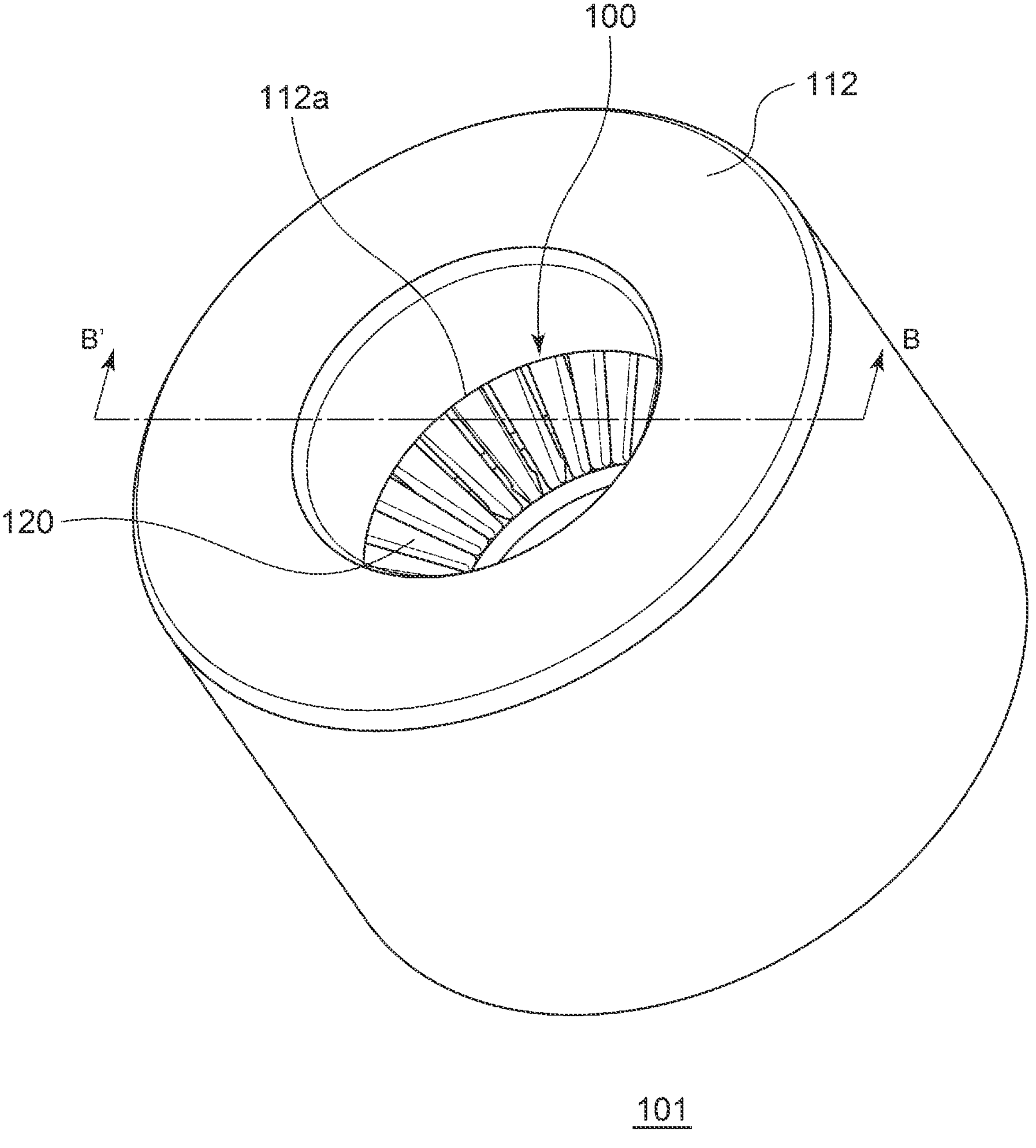
FIG. 6 is a perspective view of an electrical contact device according to the first exemplary variation.

FIG. 6 is a perspective view of an electrical contact device 101 according to the first exemplary variation. The electrical contact device 101 is provided with an electrical contact unit 100 and a first member 112. The first member 112 is a socket formed in a cylindrical shape. A groove 112*a* is formed on the inner circumference of the first member 112, and the electrical contact unit 100 is mounted in the groove 112*a*. The conductive parts 122 protrude inwardly in the radial direction from the inner circumference of the first member 112.

Figure 7:
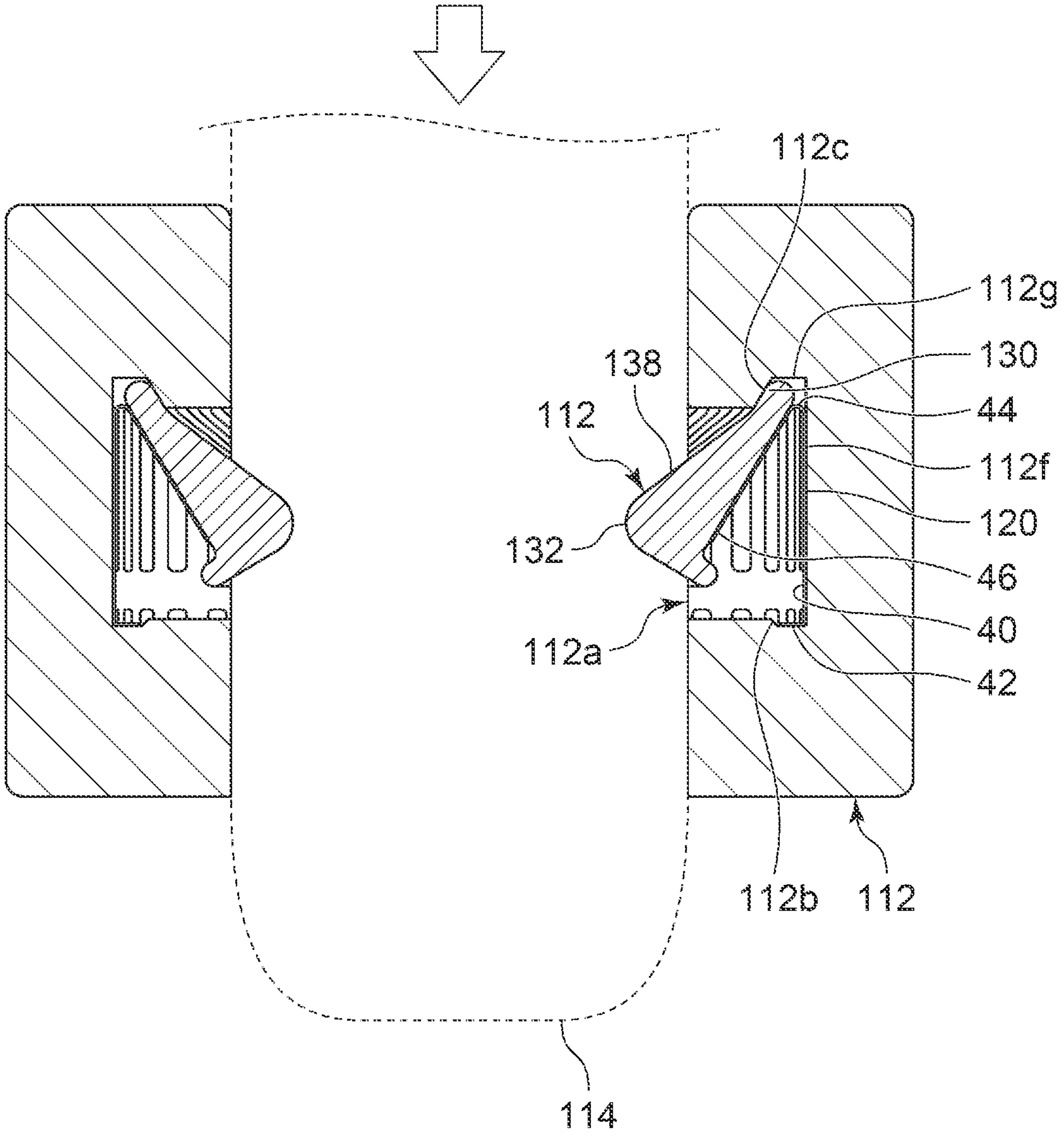
FIG. 7 is a cross-sectional view sectioned along line B-B of the electrical contact device shown in FIG. 6.

FIG. 7 is a cross-sectional view sectioned along line B-B of the electrical contact device 101 shown in FIG. 6. The second member 114 inserted into the first member 112 is shown in FIG. 7. The second member 114 is a pin that can be inserted into the first member 112, which is a socket.

The first member 112 has a groove 112*a* formed in an annular shape, a ramp 112*b* that engages with an engaging claw 42, a restricting surface 112*c* that restricts the rotation of a first abutting part 130, a recess 112*g* that receives the first abutting part 130, and a bottom surface 112*f* of the groove 112*a*.

The conductive part 122 has a first abutting part 130, a second abutting part 132, a swinging fulcrum 134, and a guide surface 138. The first abutting part 130 enters the recess 112*g* with a gap and is arranged facing the restricting surface 112*c*. The second abutting part 132 sticks out from the groove 112*a* and protrudes inwardly from the first member 112.

A swinging fulcrum 134 is located between the first abutting part 30 and the second abutting part 32 in the width direction. The swinging fulcrum 134 is supported by a support part 120 and serves as a rotational fulcrum for the conductive part 122 that is swinging. The axis of rotation of the conductive part 122 is along the tangential direction of a circle formed by the support part 120 having an annular shape and is perpendicular to the direction of insertion of the second member 114.

When the second member 114 is inserted into the first member 112, the second member 114 first hits the guide surface 138 of the conductive part 122, pushing the conductive part 122 outward in the radial direction. The second abutting part 132 of the conductive part 122 is pushed by the second member 114 toward the bottom surface 112*f*, the conductive part 122 rotates at the swinging fulcrum 134, and the first abutting part 130 is pressed against the restricting surface 112*c*. Thereby, the first member 112 and the second member 114 are energized in a conductive path passing from the second abutting part 132 through the first abutting part 130.

Figure 8:
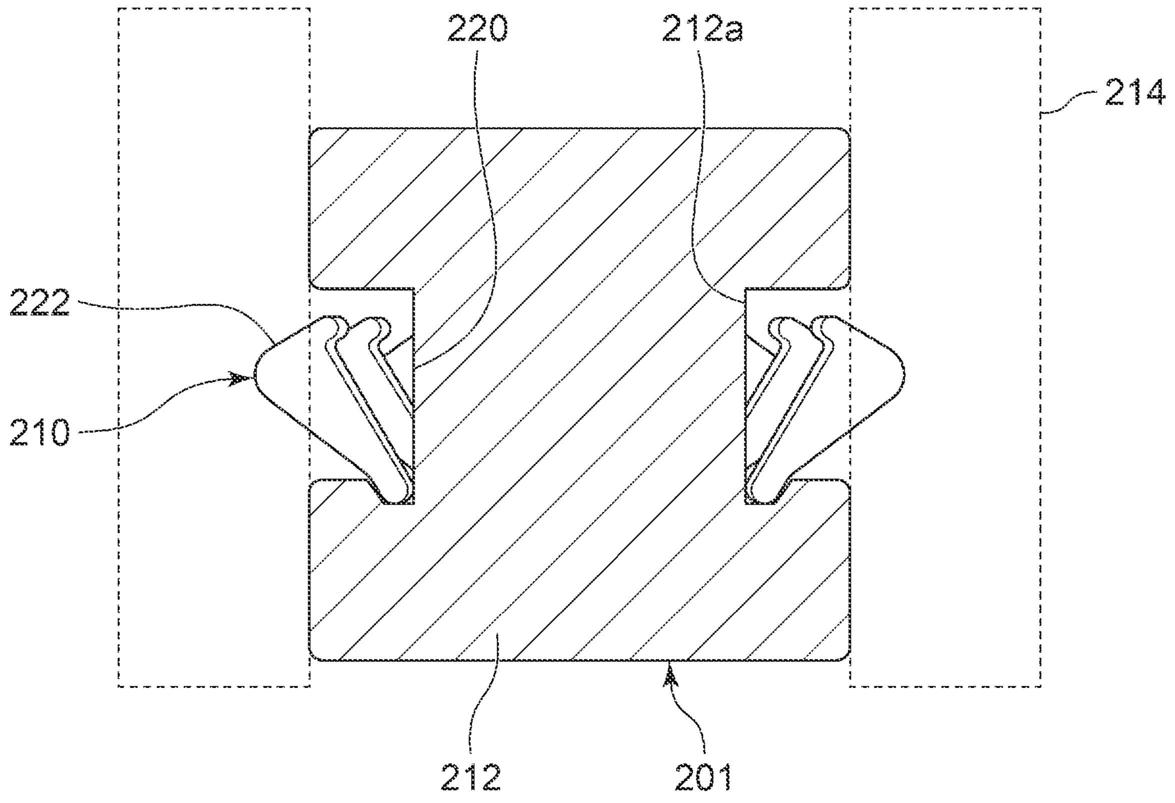
FIG. 8 is a cross-sectional view of an electrical contact device according to the second exemplary variation.

FIG. 8 is a cross-sectional view of an electrical contact device 201 according to the second exemplary variation. A socket-shaped second member 214 is also shown in FIG. 8. The electrical contact device 201 according to the second exemplary variation differs from the electrical contact device 101 shown in FIG. 7 in the mounting position of an electrical contact unit 210 in that the electrical contact unit 210 is attached to the first member 212, which is a pin, and protrudes outward. However, each function is the same.

The electrical contact unit 210 has a support part 220 and a conductive part 222, and is attached to a groove 212*a* of the first member 212. The conductive part 222 is swingably supported by the support part 220 and protrudes outward in the radial direction from the groove 212*a*.

In this way, the electrical contact unit is not limited to have a planar press-on type form, and may be provided on either a socket or a pin. In any case, in the electrical contact unit, the support part and the conductive part are made of different materials, and the conductive part is swingably supported by the support part.

Figure 9:
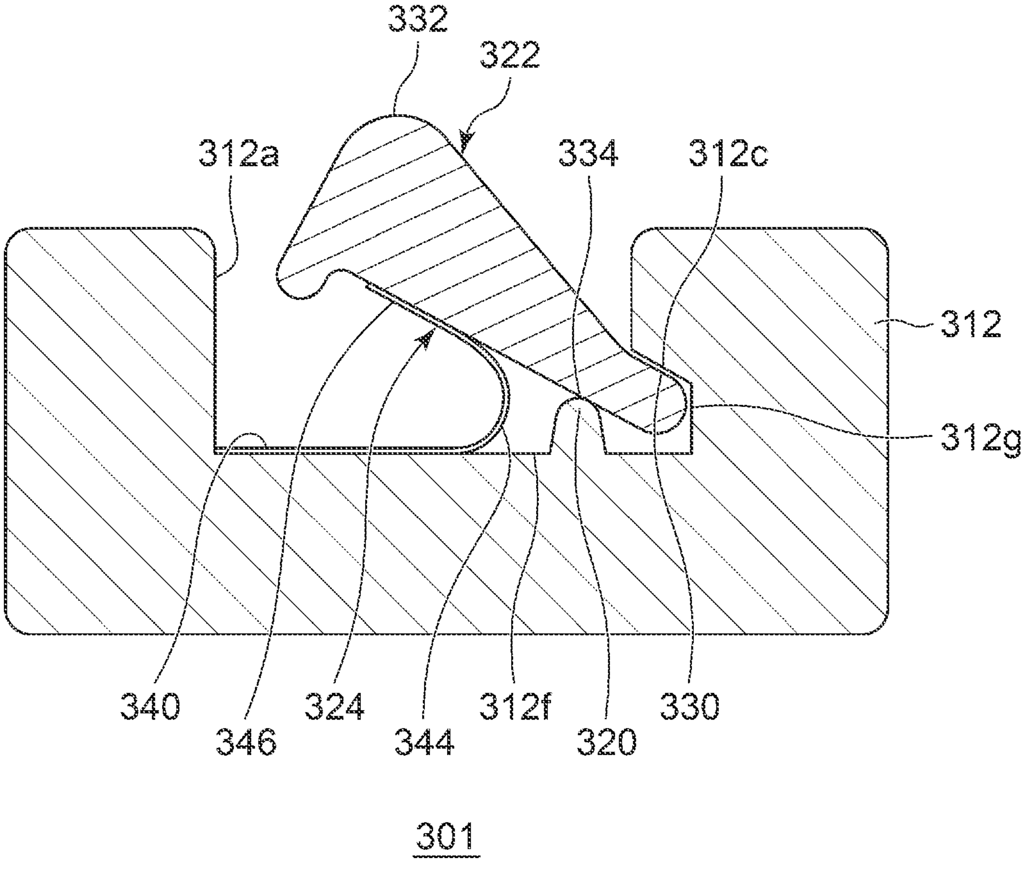
FIG. 9 is a cross-sectional view of an electrical contact device according to the third exemplary variation.

FIG. 9 is a cross-sectional view of an electrical contact device 301 according to the third exemplary variation. The electrical contact device 301 according to the third exemplary variation differs from the electrical contact device 101 shown in FIG. 3 in that a support part 320 is provided on a first member 312.

The first member 312 has a groove 312*a*, a restricting surface 312*c*, a bottom surface 312*f*, and a recess 312*g*, as well as a support part 320 protruding from the bottom surface 312*f*. A conductive part 322 has a first abutting part 330, a second abutting part 332, and a swinging fulcrum 334. The swinging fulcrum 334 is placed on and supported by the support part 320.

A spring member 324 has an engaging piece 340, a bending part 344, and a connecting part 346. The engaging piece 340 is adhered to the bottom surface 312*f*, and the connecting part 346 is adhered to the lower surface of the conductive part 22. The spring member 324 biases the second abutting part 332 of the conductive part 322 in a direction of moving the second abutting part 332 out of the groove 312*a*. In this way, a structure for supporting the swinging fulcrum 334 of the conductive part 322 may be provided in the first member 312.

The present invention is not limited to the above-mentioned exemplary embodiments, and various modifications, such as a design change, may be added thereto on the basis of knowledge of those skilled in the art. The structure illustrated in each drawing is intended to exemplify an example and can be modified as appropriate as long as the structure can achieve similar functions, and the same effects can be obtained.

What is claimed is:

1. An electrical contact unit that is provided in a first member and that electrically connects the first member and a second member, comprising:

a conductive part that is adapted to abut on the first member and the second member; and a support part that swingably supports the conductive part, wherein the conductive part has:

a first abutting part that abuts on the first member;

a second abutting part that abuts on the second member; and a swinging fulcrum that is located between the first abutting part and the second abutting part, wherein the support part supports at least the swinging fulcrum, wherein the conductive part rotates at the swinging fulcrum causing the first abutting part to be pressed against the first member when the second member is pressed against the second abutting part, and wherein the support part is a spring member and biases the conductive part toward the second member.

2. The electrical contact unit according to claim 1, wherein the support part has:

an engaging piece that engages with the first member;

a bending part that is bent and curved being folded back from the engaging piece; and a connecting part that extends from the bending part so as to face the engaging piece and connects to the conductive part, and wherein the connecting part supports the swinging fulcrum.

3. The electrical contact unit according to claim 2, wherein the bending part is displaced toward the second member when the conductive part is swung by being pressed against the second member.

4. The electrical contact unit according to claim 1, wherein the conductive part is formed thinner on the first abutting part side than on the second abutting part side.

5. An electrical contact device that electrically connects a first member and a second member, comprising:

the first member;

a support part that is provided in the first member; and a conductive part that is swingably supported by the support part and is adapted to abut on the first member and the second member, wherein the conductive part has:

a first abutting part that abuts on the first member;

a second abutting part that abuts on the second member; and a swinging fulcrum that is located between the first abutting part and the second abutting part, wherein the support part supports at least the swinging fulcrum, and wherein the conductive part rotates at the swinging fulcrum causing the first abutting part to be pressed against the first member when the second member is pressed against the second abutting part, and wherein the support part is a spring member and biases the conductive part toward the second member.

6. An electrical contact unit that is provided in a first member and that electrically connects the first member and a second member, comprising:

a conductive part that is adapted to abut on the first member and the second member; and a support part that swingably supports the conductive part, wherein the conductive part has:

a first abutting part that abuts on the first member;

a second abutting part that abuts on the second member; and a swinging fulcrum that is located between the first abutting part and the second abutting part, wherein the support part supports at least the swinging fulcrum, wherein the conductive part rotates at the swinging fulcrum causing the first abutting part to be pressed against the first member in a direction opposite to a pressing direction of the second member, when the second member is pressed against the second abutting part.

* * * * *